No. 638,918. Patented Dec. 12, 1899.
E. M. FRASER.
ELEVATOR.
(Application filed June 19, 1899.)
(No Model.)
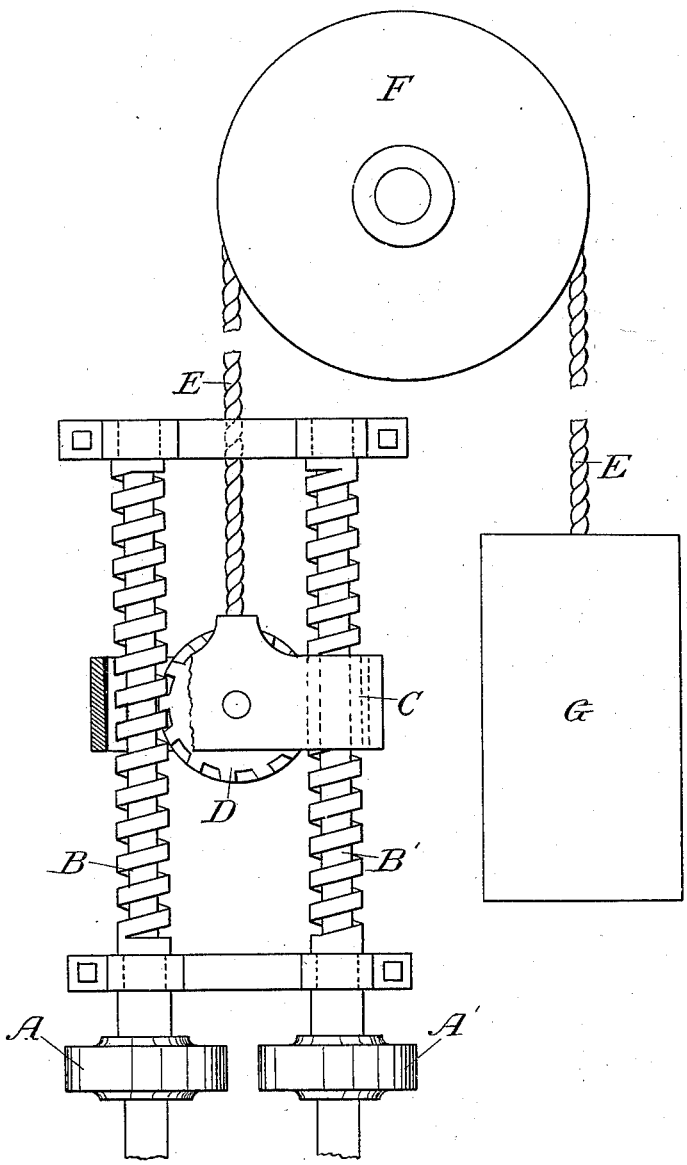
Witnesses,
Inventor,
Ethelbert M. Fraser
By Dewey Strong & Co.
Attys

UNITED STATES PATENT OFFICE.

ETHELBERT M. FRASER, OF SAN FRANCISCO, CALIFORNIA, ASSIGNOR, BY MESNE ASSIGNMENTS, TO THE OTIS ELEVATOR COMPANY, OF NEW JERSEY.

ELEVATOR.

SPECIFICATION forming part of Letters Patent No. 638,918, dated December 12, 1899.

Application filed June 19, 1899. Serial No. 721,051. (No model.)

*To all whom it may concern:*

Be it known that I, ETHELBERT M. FRASER, a citizen of the United States, residing in the city and county of San Francisco, State of California, have invented an Improvement in Elevators; and I hereby declare the following to be a full, clear, and exact description of the same.

My invention relates to an improvement in elevators or hoisting-machines such as are used for passengers or freight in buildings and like places in which the actuating mechanism is so connected and combined that it may run continuously whether the load is moving or standing still.

It consists of two independently-rotating driving-pulleys, with motive power so applied to them that they may be driven at any rate of speed with relation to each other, and screws driven independently by said motors and acting through a worm-gear upon the car, cage, or other weight which is to be raised or lowered.

My invention also comprises details of construction, which will be more fully explained by reference to the accompanying drawing, in which the figure is a view illustrating a means for applying my invention.

A A' are two pulleys which represent any source of power which operates independently for each.

B B' are screws driven by the motors A A'. These screws are here shown as extending vertically and parallel with each other within the well or hoistway and are suitably journaled at the top and bottom so as to be rotated by the action of the motors. As here shown, these screws pass through a frame or carrier C, in which is journaled the worm-gear D, the teeth of which engage with the screws B B' upon opposite sides from the frame C. A rope E extends upwardly, passing over a direction sheave or pulley F, which is journaled in the upper part of the hoistway, and from this said pulley down to the car or cage G which is to be raised or lowered.

It will be seen that by changing the relative rate of speed as the occasion requires, and by which the screws B B' are rotated, action upon the worm-gear D (and through it upon the frame C) will be to either raise or lower these parts with reference to the revolving screws, and through the rope or cable E the cage will be correspondingly affected. Thus when both of the screws are being rotated in the same direction, one more rapidly than the other, the differential of speed will act upon the worm-gear D and it will be gradually depressed along the line of the other screw and between the two, and this will serve to raise the cage connected with the opposite end of the cable.

By changing the speed of the screws, so that the first one is run slower and the second one more rapidly without changing the direction of rotation, the worm-gear and its supporting-frame will be moved upwardly and the cage correspondingly depressed.

By this construction it is possible to drive the screws continuously in the same direction, and by changing the rate of speed of the screws the power applied through the worm-gear will act to either raise or lower the cage connected therewith.

Having thus described my invention, what I claim as new, and desire to secure by Letters Patent, is—

1. The combination with independently-rotated screws, and a worm-gear engaging said screws of a frame in which the gear is journaled, a cage movable in guides, a direction-pulley, and a rope passing over said pulley having one end connected with the cage and the other with the movable gear-frame.

2. A mechanism for moving elevator-cages and the like, consisting of parallel screw-shafts, mechanism by which they are rotated at different rates of speed, a worm-gear journaled between said shafts having teeth upon its periphery engaging with the said screws, whereby different rates of rotation of the screws will cause the gear to advance in one direction or the other between them, and connections between said gear and the cage, whereby the latter is moved in unison therewith.

In witness whereof I have hereunto set my hand.

ETHELBERT M. FRASER.

Witnesses:
S. H. NOURSE,
JESSIE C. BRODIE.